United States Patent
Cassem

Patent Number: 5,495,689
Date of Patent: Mar. 5, 1996

[54] FISH FINDER AND POLE ASSEMBLY

[76] Inventor: Craig J. Cassem, 2415 N. Park Lake Dr., Morris, Ill. 60450

[21] Appl. No.: 463,252
[22] Filed: Jun. 5, 1995
[51] Int. Cl.$^6$ ................................................. A01K 79/02
[52] U.S. Cl. ............................................ 43/17.1; 367/107
[58] Field of Search .................... 43/17.6, 4; 367/107, 367/910

[56] References Cited

U.S. PATENT DOCUMENTS

| | | | |
|---|---|---|---|
| 4,995,009 | 2/1991 | Altmire et al. | 367/107 |
| 5,253,220 | 10/1993 | Wilson, Sr. | 43/17.1 |

Primary Examiner—Kurt Rowan
Assistant Examiner—Allyson D. Nelson
Attorney, Agent, or Firm—Ernest Kettelson

[57] ABSTRACT

An elongated flexible pole, a shorter flexible connecting member fixedly connected to the outer end of the flexible pole to rotate therewith, an elongated rod fixedly connected to the outer end of the flexible connecting member therewith when the handle end of the pole is rotated, a transducer of a sonar fish finding assembly fixedly connected to the outer end of the elongated rod to rotate therewith, the transducer connected by cable to the signal generating component and monitor of the sonar assembly which is positioned next to the handle end of the pole on the river bank or shoreline, the pole being held at a diagonal extending upwardly and outwardly over the body of water, and an elongated rod extends downwardly into the water on a substantially vertical line, the transducer being submerged below the surface of the water having its transmitting face pointed in a direction parallel to the surface of the water, the transducer and its transmitting face being rotatable on the vertical axis of the elongated rod when the handle of the pole is rotated to thereby transmit fish finding ultrasonci signals from the transducer's transmitting face in any desired horizontal direction and in turn receive back sound wave echoes when fish are located and impinged by the transmitted ultrasonic sound waves.

14 Claims, 3 Drawing Sheets 5,495,689

FISH FINDER AND POLE ASSEMBLY

BACKGROUND OF THE INVENTION

This invention relates to the field of fish finders that transmit signals through the water to locate fish which in turn send back corresponding signals to indicate the location of such fish, and particularly to fish finders that can be used from the bank or shoreline of a body of water.

Prior art devices of which the inventor is aware include those disclosed in the following United States patents.

U.S. Pat. No. 5,260,912 discloses a side-looking fish finder which transmits a sonar pulse approximately horizontally into a body of water and monitors its echo. The time interval between pulses is varied in a random manner to permit two or more similar units to be used in close proximity to each other without significantly interfering with each other.

U.S. Pat. No. 5,253,220 discloses a fish finder comprising a specially constructed rod and reel for electrical communication between a sensor float and a display unit releasably attached to the reel. A transducer is mounted in the float to convert the electrical signals to ultrasonic signals which are directed downward into the water and which receives sound wave echoes from any fish on which the ultrasonic signals impinge, that are then converted back to electric signals for showing on the display.

U.S. Pat. No. 5,182,732 discloses a reversible fish finder drive apparatus which rotates the fish finder transducer back and forth in a preselected pattern in a generally horizontal orientation.

U.S. Pat. No. 5,088,068 discloses a hand held underwater distance measuring device which includes a transducer for lowering about six inches into the water, telescoping tubes leading from the transducer to an electronic signal generating package and to a display unit on which to indicate numerically the distance that has been measured.

U.S. Pat. No. 4,995,009 discloses a castable fish and depth finder wherein a transducer may be cast out on a line from a rod and reel to a selected spot, at which the transducer emits signals downwardly to determine the depth of the body of water at such location as well as any fish that may be in such below the transducer location.

U.S. Pat. No. 4,982,924 discloses a mounting apparatus for a sonar transducer comprising a bracket connected to a boat and a shaft extending downwardly from the bracket at whose lower end a sonar transducer is connected. The shaft and transducer can be raised and lowered as well as pivoted to different positions.

U.S. Pat. No. 4,980,872 discloses a transducer position control comprising a mount for the transducer of horizontal axles journaled by surrounding sleeves on the depending end of a vertical standard attached to a moving boat. The sleeves and axles are interconnected with manual controls by links and universal joints at the end portions of the standard.

U.S. Pat. No. 4,979,153 discloses mounting apparatus for the sonic transducer of a fish finder comprising a tubular control arm and clamp for connecting to the side of a boat and to extend downwardly on a generally vertical axis. A pivotally mounted transducer plate is provided at the lower end for securing the transducer thereto.

U.S. Pat. No. 4,888,747 discloses a transducer control arm assembly for floating and positioning a sonar transducer in otherwise inaccessible positions for fishermen. It includes an articulated boom to extend out from a boat with a transducer directed downward to locate fish below the transducer.

U.S. Pat. No. 4,779,239 discloses a sonar transducer system having an even number of antennae formed from superimposed linear arrays operating alternatively by halves, at each change of direction of rotation, for transmission and reception. The antennae are mutually offset angularly by angles which are mutually equal as well as being equal to the rotary alternating sweep angle to which the assembly of antennae is subjected.

SUMMARY OF THE INVENTION

The fish finder and pole assembly in accordance with the present invention is an improvement over the prior art in several respects. It provides a fish finder that can be used by fisherman on shore to locate fish out from the shoreline and indicate where his fish line should be cast to catch such fish. It provides a fish finder having a sonar transducer which can be directed to transmit sound waves and receive back sound wave echoes horizontally to and from the transducer. It also provides a mechanism and construction whereby the transducer submerged in the water from the end of a pole can be rotated from right to left and left to right to transmit and receive horizontal signals in any desired direction facing toward the horizon by merely rotating the handle end of the pole, such as clockwise rotation to pivot the transducer to face horizontally from left to right and counterclockwise rotation of the handle end to pivot the transducer to face horizontally from right to left.

The fish finder and pole assembly in accordance with this invention includes an elongated telescoping flexible pole, a flexible length of bunge cord or similar material fixedly connected to the outer end of the pole to rotate therewith, an elongated rod fixedly connected to the other end of the bunge cord length to rotate when the bunge cord is rotated, and a sonar transducer connected to the lower end of the elongated rod. The sonar transducer is fixedly connected to the elongated rod so it will also rotate when the rod, bunge cord and pole are rotated.

The sonar transducer has a signal transmitting and receiving face to transmit and receive signals to and from the direction it faces. The sonar transducer is connected to the elongated rod in a way that the transmitting and receiving face is facing in a direction that is normal or perpendicular to the longitudinal axis of the elongated rod. Thus, when the elongated rod is rotated on a vertical axis as it extends down into the water, the transmitting and receiving face of the transducer is facing horizontal and rotates in a horizontal arc.

A signal generating, processing and transmitting component together with a monitor is connected by a cable to the transducer to first generate an electronic signal which the transducer receives and converts to an ultrasonic pulse or spurt and to second receive an electronic signal back from the transducer when it receives a corresponding sound wave echo back from whatever object its outwardly transmitted ultrasonic pulse has impinged upon which the transducer converts to an electronic signal to return to the signal generating, transmitting and processing component and monitor for display.

Other advantages and features of the invention will become apparent from the more detailed description which follows and from examination of the drawings.

DESCRIPTION OF PREFERRED EMBODIMENT

Figure 1:
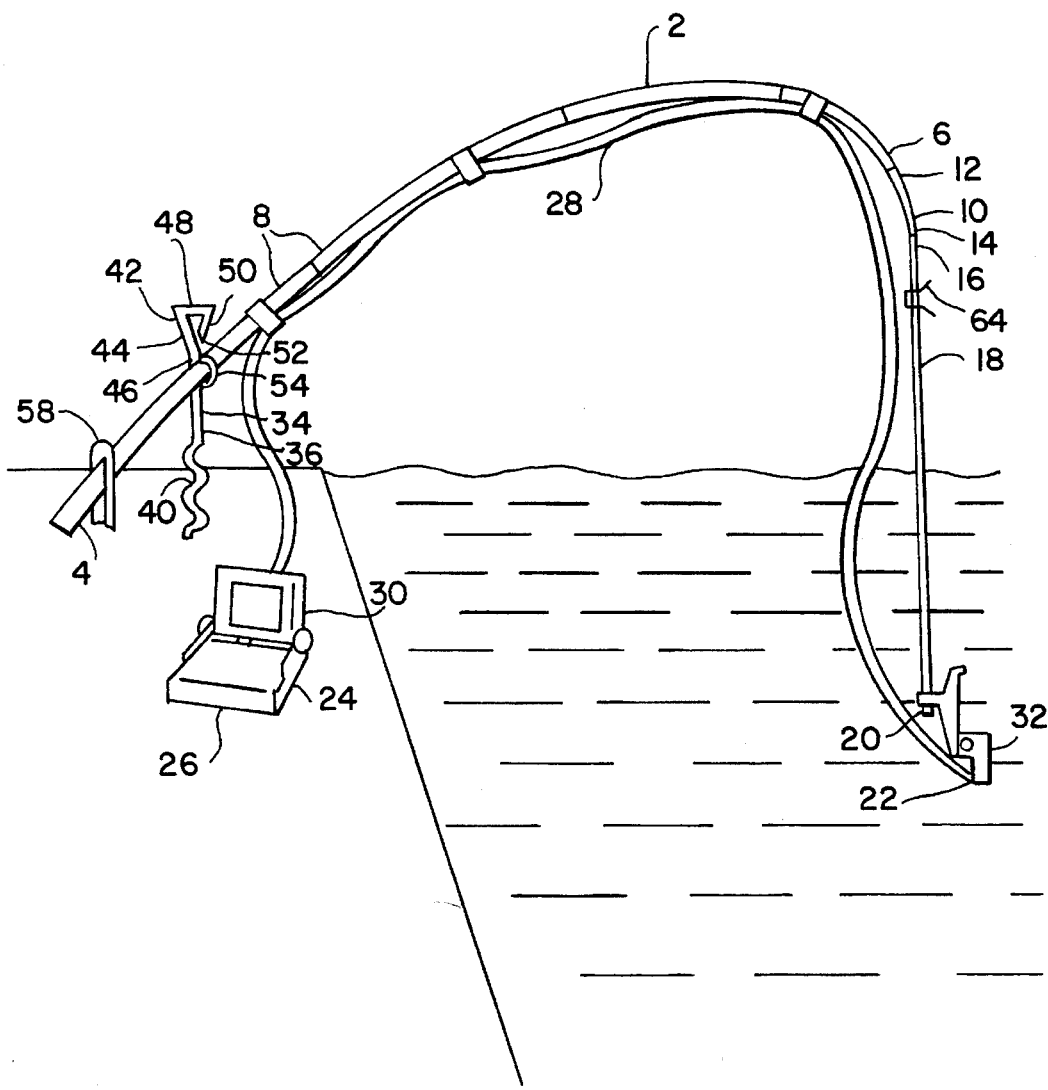
FIG. 1 is a perspective view of a fish finder and pole assembly in accordance with this invention.
Figure 2:
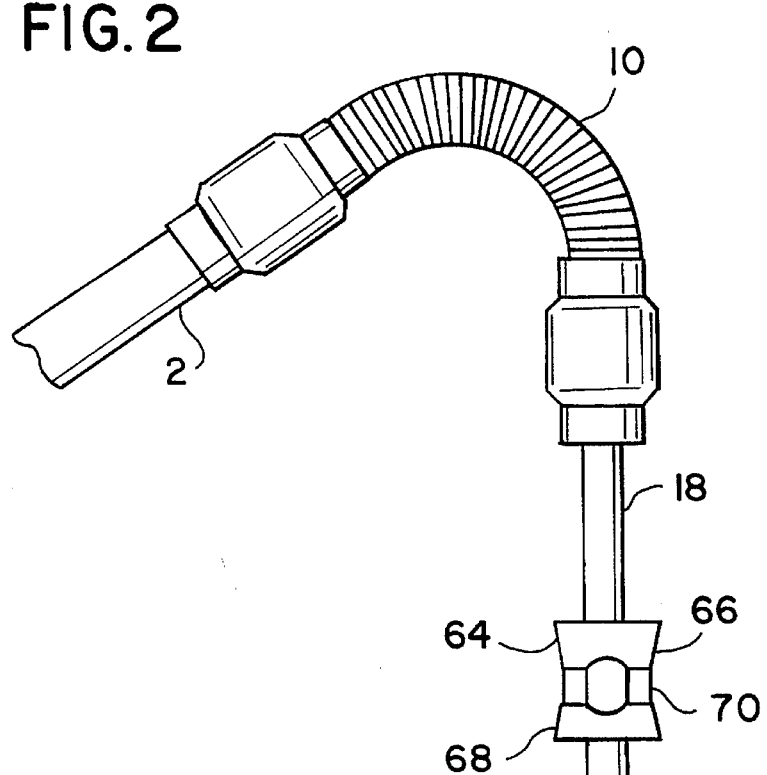
FIG. 2 is a side elevation view of a portion of the pole shown fixedly connected to the flexible connecting member which in turn is fixedly connected to the vertically extending rod with the transducer of a sonar fish finding assembly fixedly connected to the lower end of the connecting rod.
Figure 3:
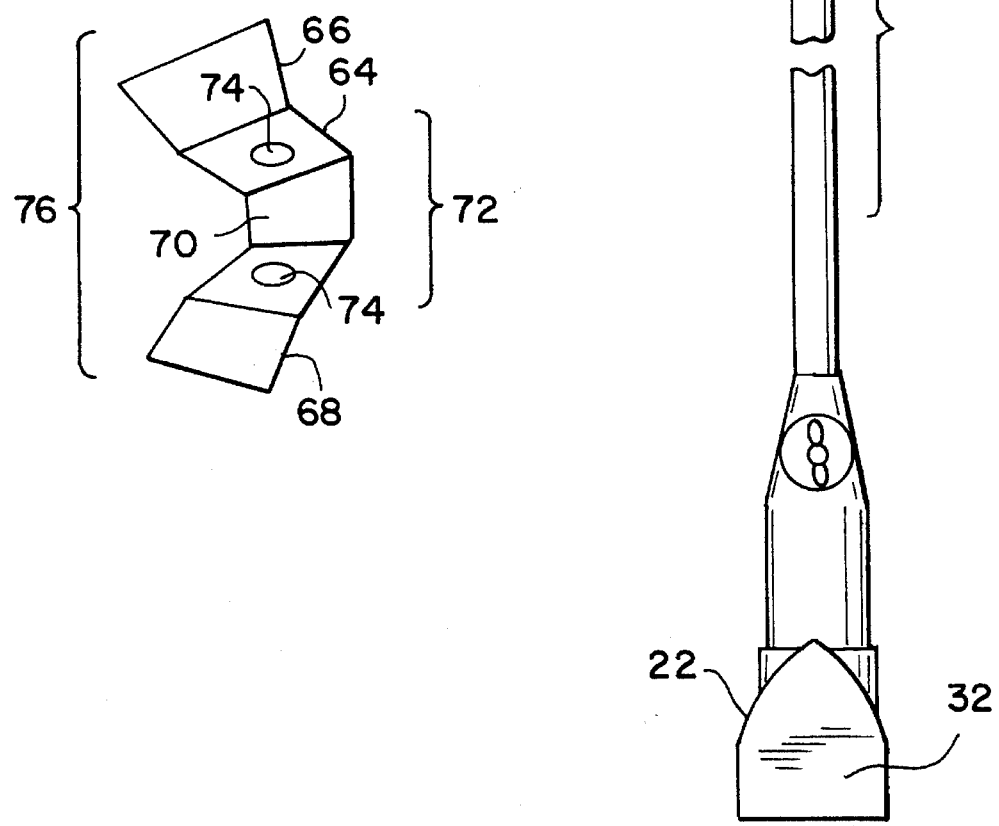
FIG. 3 is a perspective view from the front of the direction indicator shown connected to the elongated rod in FIG. 2 which indicates the direction in which the transducer transmitting and receiving surface is facing.
Figure 4:
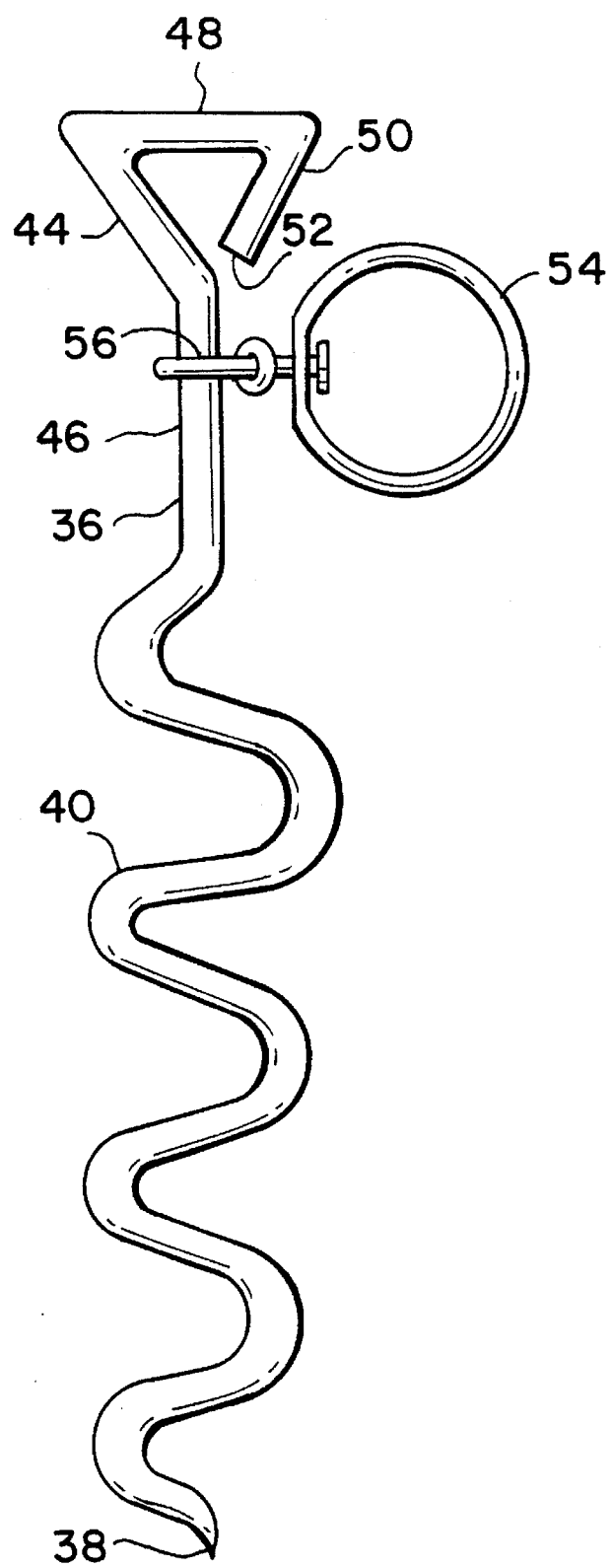
FIG. 4 is an elevation view of the pole positioning and holding stake.
Figure 5:
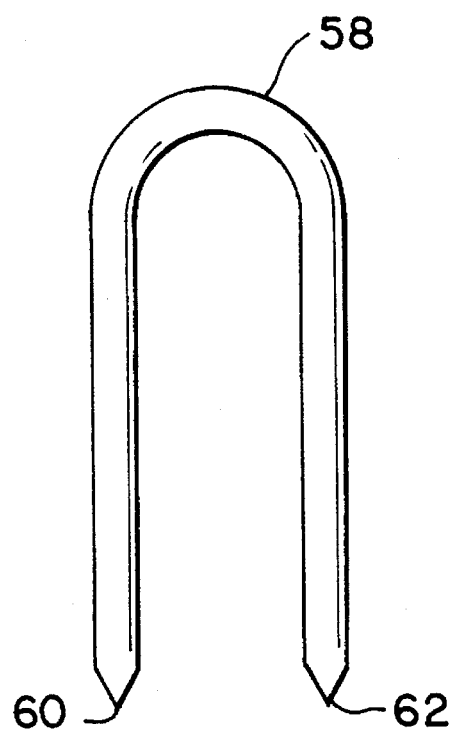
FIG. 5 is an elevation view of the retaining arch which is placed in the ground behind the stake shown in FIG. 4 to receive the handle end of the pole therethrough.

A fish finder and pole assembly in accordance with this invention includes an elongated pole 2 of the type commonly used for fishing having a handle end 4 which the fisherman can manipulate and an opposite outer end 6. The pole 2 preferably includes telescoping sections 8, whereby the pole may be retracted for carrying and storage and extended when ready to use.

A flexible connector 10 such as a short length of bunge cord has one end 12 fixedly secured to the outer end 6 of the pole 2 to rotate therewith and its opposite end 14 fixedly connected to the upper end 16 of an elongated slender rod 18 of metal or the like to rotate rod 18 when pole 2 and flexible connector 10 are rotated. The lower end 20 of the rod 18 has a transducer 22 of a portable sonar fish detecting assembly 24 fixedly connected thereto, whereby the transducer 22 rotates with the rod 18 when the pole 2 and flexible connector 10 are rotated.

The fish detecting assembly 24 comprises a sound wave generating, transmitting and receiving unit 26 connected by cable 28 to the transducer 22, and a monitor 30. The sound wave generating, transmitting and receiving unit 26 is electrically powered by batteries and generates electrical signals which the transducer 22 converts to high frequency sound waves in spurts or pulses. When such sound wave pulse strikes an object, a corresponding sound wave echo is transmitted back to the transducer 22, which relays the picked up echo signal back to the generating, transmitting and receiving unit 26 wherein the length of time between transmitting the sound wave pulse and receiving the echo wave in return is processed electronically to determine the distance the object struck by the sound wave is from the point of transmission. The transmitted sound wave pulse is also directional, so the direction calculated as number of degrees from true north in which the object is located from the point of transmission is also known and electronically processed by the generating, transmitting and receiving unit 26. Such processed information as to distance and location is electronically relayed by unit 26 to the monitor 30 on which the location of the item struck by the sound wave is displayed.

Sound is known to travel through water at approximately 4,800 feet per second which makes it possible for the portable sonar fish detecting assembly 24 to calculate the distance an item struck by transmitted sound waves is from the point of transmission when the time it takes for the return echo to be picked up by the transducer is determined.

The elongated pole 2 is preferably made of a flexible material whereby it bows in an arc when the telescoping sections 8 are extended and the pole 2 is held at an upwardly and outwardly extending diagonal position. The flexible connector 10 secured to the outer end 6 of the pole 2 flexes in an arc of shorter radius than that of the pole itself, whereby the elongated rod 18 extends downward on a substantially vertical line when the fish finder and pole assembly is in use with the transducer 22 at the lower end 20 of rod 18 in the water, and the pole 2 is held at an outwardly and upwardly extending diagonal position. The transducer 22 has sufficient weight when in the water to cause the pole 2 and flexible connector 10 to bow in an arc that directs the opposite end 14 of the flexible connector 10 which is connected to the upper end 16 of rod 18 downwardly, with the axis of said opposite end 14 extending coaxially with the longitudinal axis of rod 18. Thus, when rod 18 and its longitudinal axis extends vertically, the axis of the said opposite end 14 of the flexible connector 10 also extends vertically.

Such construction makes it possible to rotate the rod 18 about its vertically extending axis as well as the transducer 22 connected to its lower end by rotating the handle end 4, of the rod 2. The transmitting and receiving face 32 of the transducer 22 faces and transmits high frequency sound waves in a direction normal to the axis of the rod 18. Thus when the rod 18 extends vertically down into the body of water, the transducer's transmitting and receiving face 32 transmits sound wave pulses and receives sound wave echoes horizontally through the water in the azimuth direction, or number of degrees from true north moving clockwise, in which the transducer's face 32 is pointed. The transducer's face 32 can be rotated from one azimuth direction to another by rotating the pole 2 at its handle end 4. When the handle end 4 of pole 2 is rotated clockwise, the construction as described of the pole 2 extending in an arc and the flexible connector 10 bowing in a more pronounced arc of shorter radius causes the vertically extending rod 18 to also rotate clockwise. That in turn causes the transducer's face 32 to rotate from a left to right azimuth direction, or from a lower number of degrees direction relative to true north toward a higher number of degrees direction counting clockwise from true north.

When the handle end 4 of the diagonally extending pole 2 is rotated counter-clockwise, the vertically extending rod 18 also rotates counter-clockwise, causing the transducer's face 32 to rotate from a right to left azimuth direction, or from a higher number of degrees direction relative to true north toward a lower number of degrees direction.

In this way, the transducer's face 32 can be rotated in the water to direct high frequency sound waves from left to right and vice versa to sweep the horizon and thus locate fish anywhere within the area to the left and right of the direction being faced by the pole 2, which are within the distance limitations of the particular sonar fish detecting assembly 24 being used, i.e. the distance which it can transmit, receive and usefully process high frequency sound waves and their return echoes.

The fish finder and pole assembly in accordance with this invention is particularly well adapted for fishing from the bank or shoreline of a body of water. A pole positioning and holding device 34 is provided to hold the pole 2 in place on the bank adjacent to the body of water in which the fish finder and pole assembly is to be used. The holding device 34 includes an elongated stake 36 having a sharply pointed end 38 for inserting into the ground and a helically wound section 40 to provide leverage when the stake is rotated to screw into the ground. The upper end 42 is formed into a triangular shape having a first diagonal portion 44 which extends upwardly as a continuation of the stake shaft 46, a laterally extending hand grasp portion 48, and a second diagonal portion 50 which extends downwardly from the hand grasp portion 48 to terminate at free end 52 adjacent the stake shaft 46.

A ring member 54 is secured to the stake shaft 46 by a link 56. The ring member 54 has an inner diameter which is slightly larger than the diameter of the elongated pole 2 for reception of the pole 2 therethrough when the stake 36 has been screwed into the ground.

An inverted U-shaped anchor member 58 having sharply pointed free ends 60 and 62 is driven into the ground behind the stake 36, leaving an arched opening between the closed end of the inverted U-shaped member and the ground. The handle end 4 of the pole 2 is received through the arched opening to hold it in place near ground level while a forward portion of the pole 2 is held by the ring member 54 at a higher level above the ground. The pole 2 is thereby held in an outwardly and upwardly extending diagonal position with its outer end 6 over the body of water and the rod 18 extending vertically down into the water with the transducer 22 submerged below the surface. The transducer face 32 is at such time facing horizontally to transmit sound waves horizontally through the water to locate fish outwardly from the bank or shoreline and to receive sound wave echoes back horizontally from any fish that are located.

The generating, transmitting and receiving unit 26 and monitor 30 are placed next to the handle end 4 of the pole 2 held by the positioning and holding device 34. The fisherman can locate the position of fish on the monitor and then cast his line from the bank or shoreline out to such location in the body of water.

A direction indicator 64 is secured to the elongated rod 18 to rotate therewith and indicate the direction in which the transducer face 32 is facing to transmit and receive sound wave signals to and from such direction. The direction indicator 64 comprises a length of spring sheet metal material having a pair of spaced apart arms 66 and 68 which are connected at one end by an end wall 70. They extend from the end wall 70 in slightly diverging angles to provide rod securing section 72. Aligned apertures 74 are provided through each of the arms 66 and 68 having a diameter large enough to receive the rod 18 when the arms are pressed together to a substantially parallel relationship. When such pressure is released, the arms 66 and 68 spring back to their slightly diverging position whereby the edges of the apertures 74 bite into the rod 18 to then hold the direction indicator 64 in a fixed position to rotate with the rod 18. The arms 66 and 68 have more pronounced diverging portions 76 that extend outwardly from the slightly diverging portion of the arms in the rod securing section. The arms 66 and 68 and their more pronounced diverging portions 76 are positioned to point in the direction that transducer face 32 is facing. The fisherman on the bank can then tell by looking at the direction indicator 64 the direction in which the sound wave pulses are being transmitted from the transducer 22.

I claim:

1. A fish finder and pole assembly comprising an elongated pole having a handle end and an oppositely disposed connecting end, an elongated connecting rod having a first end and an oppositely disposed second end, connecting means to fixedly couple said first end of said connecting rod with said connecting end of said elongated pole whereby said connecting rod rotates with said elongated pole when said elongated pole is rotated, signal transmitting and receiving means to transmit fish finding signal means on a path through a body of water to impinge on fish in said path and to receive fish located signal means back on the same path when said fish finding signal means does impinge on said fish, said signal transmitting and receiving means includes a signal sending and pick up component shaving a working side facing in the direction said fish finding signal means is transmitted therefrom and at which said fish located signal means is received, said signal sending and pick up component being fixedly connected to said connecting rod whereby said signal sending and pick up component rotates with said connecting rod when it is rotated by rotating said elongated pole, vertical positioning means to position said connecting rod in a substantially vertical position when it extends from said elongated pole and said connecting means coupling said connecting rod to said pole, said signal sending and pick up component being fixedly connected to said connecting rod with its said working side facing in a direction normal to the axis of said elongated connecting rod whereby said fish finding signal means are transmitted therefrom and said fish located signal means are received back thereto on a substantially horizontal path when said connecting rod is in said substantially vertical position.

2. A fish finder and pole assembly as set forth in claim 1, wherein said signal transmitting and receiving means includes a generating and processing component to generate said fish finding signal means and to process said fish located signal means when received to determine and indicate where said fish are located, a cable extending from said generating and processing component to said signal sending and pick up component to transmit said fish finding signal means thereto which are generated by said generating and processing component and to transfer back to said generating and processing component the said fish located signal means when picked up by said signal sending and pick up component, and a monitor having a visual display screen to receive and visually display the location of fish when determined by said generating and processing component.

3. A fish finder and pole assembly as set forth in claim 1, wherein said vertical positioning means comprises a said elongated pole made of a flexible material whereby it bows in an arc with its said connecting end and said connecting rod coupled thereto extending downwardly in a substantially vertical position when said pole is extended outwardly and upwardly at a diagonal and when said signal sending and pick up component connected to said connecting rod is suspended therefrom.

4. A fish finder and pole assembly as set forth in claim 1, wherein said vertical positioning means comprises said connecting means, said connecting means comprising a length of flexible material having one end fixedly connected to said connecting end of said elongated pole to rotate therewith and its other end fixedly connected to said first end of said connecting rod to cause it to rotate therewith, said length of flexible material comprising said connecting means bowing in an arc with its said other end and said connecting rod coupled thereto extending downwardly in a substantially vertical position when said pole is extended outwardly and upwardly at a diagonal and when said signal sending and pick up component connected to said connecting rod is suspended therefrom.

5. A fish finder and pole assembly as set forth in claim 1, wherein said vertical positioning means comprises a said elongated pole made of a flexible material whereby it bows in a first arc and said connecting means, said connecting means comprising a length of flexible material having one end fixedly connected to said connecting end of said elongated pole to rotate therewith and its other end fixedly connected to said first end of said connecting rod to cause it to rotate therewith, said length of flexible material comprising said connecting means bowing in a second arc with its said other end and said connecting rod coupled thereto extending downwardly in a substantially vertical position when said pole is extended outwardly and upwardly at a diagonal and when said signal sending and pick up component connected to said connecting rod is suspended therefrom, said second arc having a shorter radius than that of said first arc.

6. A fish finder and pole assembly as set forth in claim 1, wherein said signal transmitting and receiving means comprises a portable sonar fish detecting assembly.

7. A fish finder and pole assembly as set forth in claim 4, wherein said length of flexible material comprising said connecting means includes a length of bunge cord.

8. A fish finder and pole assembly as set forth in claim 2, wherein said handle end portion of said elongated pole is held in position on land along the bank of a body of water, the said connecting end of said pole extending outwardly over said body of water, said connecting rod extending vertically into said body of water, said signal sending and pick up component being submerged in said body of water with its said working side facing horizontally outwardly away from said land below the surface of said body of water, said generating and processing component and said monitor being on said land adjacent to said handle end of said elongated pole, said cable extending from said signal sending and pick up component to said signal generating and processing component extending upwardly along said connecting rod, then secured to said elongated pole at spaced apart locations and then extending therefrom to said signal generating and processing component.

9. A fish finder and pole assembly as set forth in claim 1, wherein said elongated pole includes telescoping sections.

10. A fish finder and pole assembly as set forth in claim 1, including means to hold said handle end portion of said elongated pole in place on land adjacent to a body of water with its said connecting end extending outwardly above said body of water.

11. A fish finder and pole assembly as set forth in claim 10, wherein said means to hold said handle end portion of said elongated pole in place on land comprises an elongated stake member having a sharply pointed lower end for inserting into the ground, a next adjacent helically extending portion for screwing the stake into the ground, and an upper end having a laterally extending bar portion to provide a hand grasp, a ring member secured to said stake between said upper end and said helical portion by a link member, including said link member, said ring member having an inner diameter slightly larger than the diameter of said elongated pole for reception through said ring member, and an inverted U-shaped anchor member having sharply pointed free ends for pressing into the ground behind said stake thereby forming an arch to receive the said handle end portion of said elongated pole therethrough which extends rearwardly from the portion of the pole received through said ring member secured to said stake.

12. A fish finder and pole assembly as set forth in claim 1, including direction indicating means affixed to said elongated connecting rod to visually indicate the direction said fish finding signal means are transmitted from said signal sending and pick up component which is fixedly connected to said connecting rod.

13. A fish finding and pole assembly as set forth in claim 12, wherein said direction indicating means comprises a pair of spaced apart arms, an end wall extending between said spaced apart arms at one end thereof, said spaced apart arms including a rod securing section extending outwardly from said end wall wherein said spaced apart arms are normally biased to extend outwardly at slightly diverging angles, each of said spaced apart arms including an aperture in said rod securing section axially aligned with each other and each having a diameter corresponding to the diameter of said connecting rod for reception therethrough when said spaced apart arms are pressed toward each other to a substantially parallel relationship, said apertures being small enough relative to said connecting rod whereby their edges bite into and grip said connecting rod when pressure is released and they return to their normally biased slightly diverging position as they extend outwardly from said end wall, said spaced apart arms being positioned on said connecting rod to indicate the direction faced by said working side of said signal sending and pick up component.

14. A fish finding and pole assembly as set forth in claim 13, wherein said spaced apart arms of said direction indicating means include a more pronounced diverging section extending outwardly from said rod securing section to provide a more readily visible portion of said direction indicating means.

* * * * *